United States Patent [19]

Files et al.

[11] 4,098,211

[45] Jul. 4, 1978

[54] BUMPER RINGS

[75] Inventors: James H. Files, New Orleans, La.; John M. Montague, Dallas; Clarence T. Thomerson, Corsicana, both of Tex.

[73] Assignee: Regal Tool & Rubber Co., Inc., Corsicana, Tex.

[21] Appl. No.: 732,654

[22] Filed: Oct. 15, 1976

[51] Int. Cl.² .............................................. B63B 59/02
[52] U.S. Cl. .................................... 114/219; 114/220; 267/140
[58] Field of Search .............. 114/219, 220, 267, 266; 267/139, 140; 61/48

[56] References Cited

U.S. PATENT DOCUMENTS

| 2,562,957 | 8/1951 | Sipkin et al. | 114/220 |
| 3,464,214 | 9/1969 | King | 114/219 |
| 3,606,295 | 9/1971 | Appleton | 267/140 |
| 3,716,999 | 2/1973 | Middelbeek | 267/140 |
| 3,901,040 | 8/1975 | Sandberg | 114/219 |
| 3,991,582 | 11/1976 | Waldrop et al. | 61/48 |

*Primary Examiner*—Trygve M. Blix
*Assistant Examiner*—Stuart M. Goldstein
*Attorney, Agent, or Firm*—Richards, Harris & Medlock

[57] ABSTRACT

A bumper assembly for fending off vessels floating adjacent a marine structure includes bumper rings having flat lower surfaces and uniquely relieved upper outer surfaces. In a further aspect, an assembly includes a spring support element at one end thereof.

4 Claims, 12 Drawing Figures

BUMPER RINGS

SUMMARY OF THE INVENTION

This invention relates to bumper rings for systems which fend off boats and barges from stationary marine structures to which the bumpers are attached, and more particularly relates to bumper rings of unique construction.

BACKGROUND OF THE INVENTION

Offshore platforms which the present invention is designed to protect are semirigid structures subject to damage by excessive shock loading. As drilling progresses to deeper waters in more open seas with the use of heavier supply boats and barges, it has become necessary to develop better protective systems. Such systems are generally attached to individual legs of the offshore platform. In the past, it has been the practice to use cast-off vehicle tires, usually large off-the-road or aircraft tires, mounted on a supporting column next to the platform leg, as shown for instance in Blackman U.S. Pat. No. 2,413,210 or Rolando, U.S. Pat. No. 2,952,979, the latter showing the practice of filling the tires with cable or other material to prevent their excessive sagging or collapse. Some special structures have been built for this purpose, a shown for instance in Roach, U.S. Pat. No. 3,005,435 and Schwall, U.S. Pat. No. 2,424,635. However, each has attendant drawbacks. The cast-off vehicle tire systems involve the difficulty of finding a plurality of tires of the same large size, as well as the problems which arise when corded tires become waterlogged and sag. Moreover, deflected vehicle tires exhibit very poor shock absorption capabilities. Schwall, supra, resorted to making special rubber bumper moldings for this purpose, but such bumpers are mounted in a nonrotating manner and are therefore subject to early destruction. Roach shows rotating cushions, but the use of axles and bearings provides too fragile a structure to withstand open-sea battering.

THE PRESENT INVENTION

In accordance with one aspect of the present invention, a stack of specially shaped bumper rings having a common mounting axis are supported top and bottom on a supporting frame. The supporting frame includes a pipe column.

Specially shaped bumper rings have an inner diameter sized to receive and freely move on the pipe column. The top and bottom surfaces of the bumper ring are generally parallel to one another and have a lower out facing cylindrical surface and an upper out facing conical surface of about half the height of the ring. The out facing cylindrical surface and the out facing conical surface preferably are joined together by first and second arcuate zones, respectively, where the arc radius of the second zone is larger than the arc radius of the first zone.

In a further aspect the bumper ring stack includes a compressible bumper ring for receiving and absorbing axially directed forces.

DESCRIPTION OF THE DRAWINGS

The novel features believed characteristic of the invention are set forth in the appended claims. The invention itself, however, as well as further objects and advantages thereof, will best be understood by reference to the following detailed description of illustrative embodiments taken in conjunction with the accompanying drawings, in which:

DESCRIPTION OF THE PREFERRED EMBODIMENT

Figure 1:
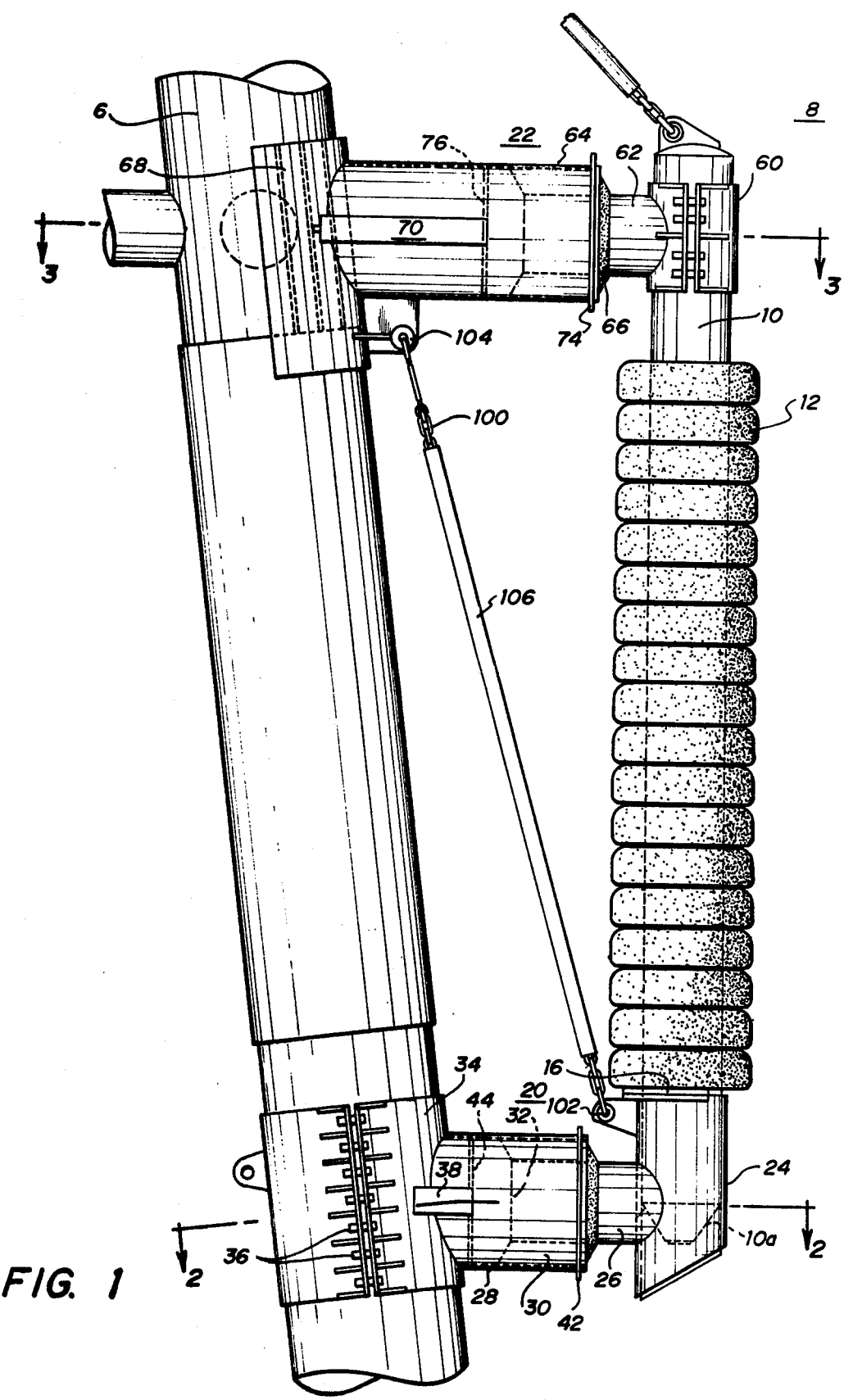
FIG. 1 is an elevation view showing an illustrative embodiment of the bumper system of the present invention.

Referring now to FIG. 1, a leg 6 of an offshore platform (not shown) supports a bumper assembly 8. Bumper assembly 8 includes a column 10 which supports a stacked series of elastomeric cylindrical bumper rings 12 surrounding the column 10 and having inner peripheries loosely fitted thereto so that the rings 12 can freely rotate on the column 10. A lower stop plate 16 supports the bottommost ring and the other rings stacked thereabove. Column 10 is coupled to the platform leg 6 by two shock cells 20 and 22.

Shock cell 20 comprises a short vertical cylinder 24, which is welded to a short horizontal cylinder 26. Cylinder 24 is hollow with the lower end thereof being cut on a taper to slope downwardly and inwardly towards leg 6. The lower end 10a of pipe column 10 is conical in shape so that it can be stabbed into cylinder 24.

Cylinder 26 is supported by an outer cylinder 28 through a cylindrical rubber body 30, which is adhered to the inner surface of cylinder 28 and the outer surface of cylinder 26. The end of cylinder 26 opposite vertical cylinder 24 is closed by a plate 32.

Cylinder 28 is welded to a split cylinder clamp 34. Clamp 34 encircles and secures the shock cell 20 to the leg 6. The clamp 34 formed in two halves is to be secured to leg 6 by a series of bolts 36. Cylinder clamp 34 is provided lateral rigidity by beams 38. A reinforcing ring 42 encircles the cylinder 28 at the open end and functions to oppose forces applied for deflection of cylinder 26.

A stop plate 44 is welded inside cylinder 28. Plate 44 is mounted to shear loose in response to unusual forces so that the cylinder 26 can continue its travel and further deflect the shock cell 20.

The upper end of column 10 is secured in a split cylinder clamp 60 having an integral cylinder 62 which is supported coaxially in an outer cylinder 64 by a rubber cylindrical body 66. Rubber body 66 is adhered to the outer surface of cylinder 62 and to the inner surface of cylinder 64. Cylinder 64 is secured to leg 6 by a doublet half cylinder 68, which includes beams 70. Beams 70 strengthen and secure cylinder 64 to half cylinder 68. Shock cell 22 also includes a reinforcing ring 74 encircling cylinder 64 at its open end. Reinforcing ring 74 performs a similar function as reinforcing ring 42 of shock cell 20, opposing forces applied for deflection of cylinder 62.

Shock cell 22 further includes a stop plate 76 which is peripherally welded inside of cylinder 64. Stop plate 76 serves the same function as stop plate 44 in shock cell 20.

By providing like shock cells 20 and 22 both at the bottom and the top of column 10, energy absorption will be the same whether the bumper array 12 is contacted by a boat near the upper end or near the lower end. However, while providing this desirable reaction, it is also desirable to avoid maintenance of any substantial static load on shock cells 20 and 22. For this purpose, a tensile bearing support anchor such as a chain 100 or the like, is connected to a lifting eye 102 on the lower end of column 10 and extends upwardly at an angle of approximately 15° measured from column 10 where it is secured to an eyelet 104 attached to leg 6. The chain 100 may be covered by a rubber encasement 106. By this means the static loads which would otherwise tend to cause the rubber bodies 30 and 66 to creep are substantially eliminated.

Figure 2:
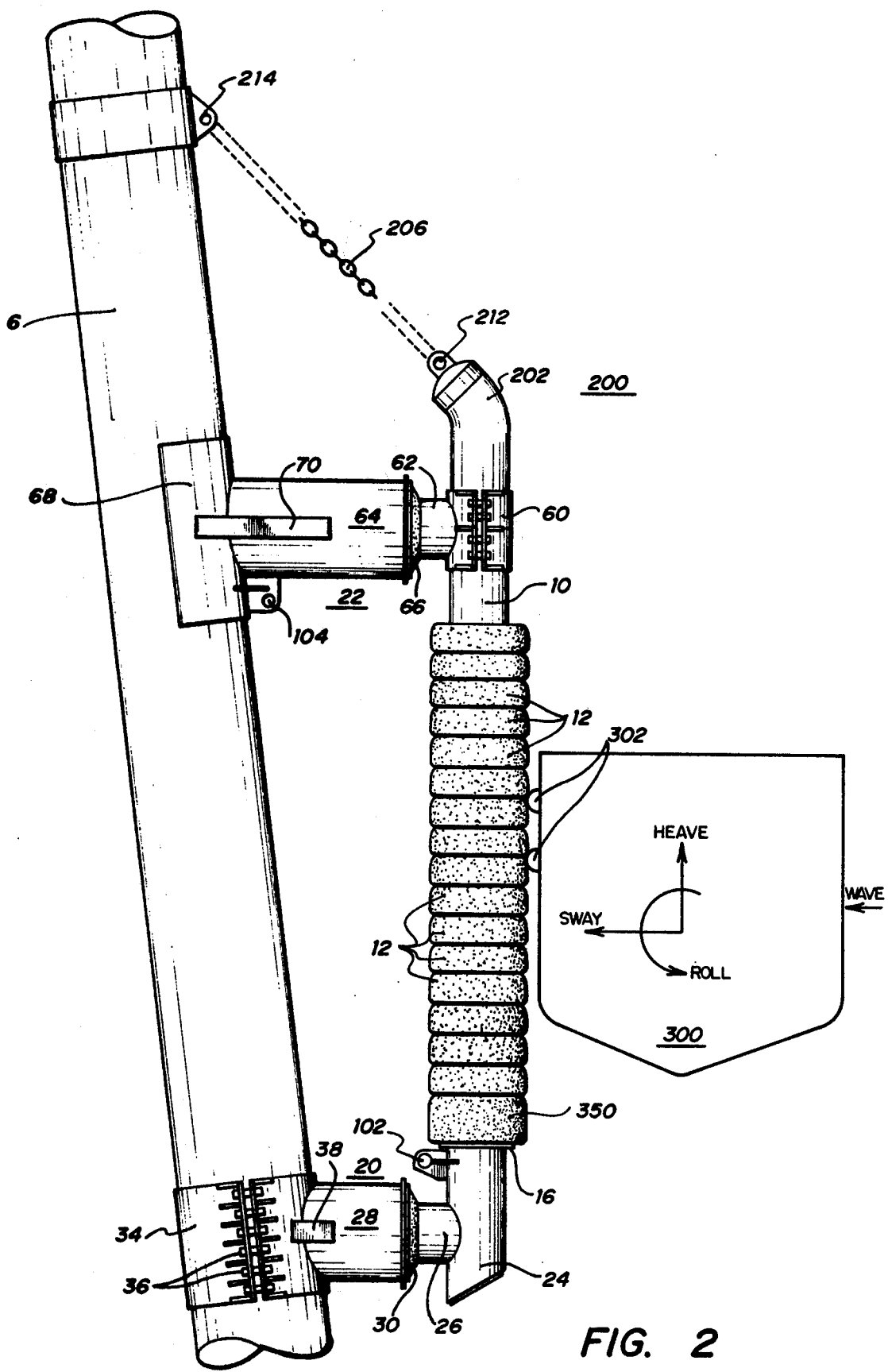
FIG. 2 is an elevation view of a second embodiment of the bumper system of the present invention.

In FIG. 2, a second bumper assembly 200 is shown, with like numerals being utilized for like and corresponding parts as in FIG. 1. An elbow 202 extends from the upper end of pipe column 10. Elbow 202 serves to prevent vessels from hanging up upon the top end of pipe column 10. Bumper assembly 200 may be given static support by flexible tension bearing anchor 206. Anchor 206 may comprise a chain similar to chain 100 of FIG. 1. Chain 206 is connected to a lifting eye 212 on the upper end of the elbow 212 and extends upwardly at approximately a 45° angle where it is secured to an eyelet 214 attached to leg 6. It functions to relieve the static loads on shock cells 20 and 22 and may be used in place of chain 100.

Figure 3:
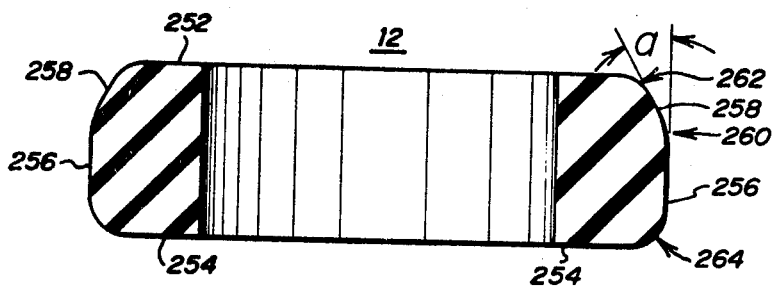
FIG. 3 is a full sectional view of a first embodiment of a bumper ring.

Referring to FIG. 3, bumper ring 12 is shown in full section. Ring 12 is formed of an elastomeric material such as rubber or the like, and has an inner diameter sized to receive and freely move on column 10 (FIGS. 1 and 2). Ring 12 has a top and bottom surface, 252 and 254, respectively, and an out facing cylindrical surface 256. Top surface 252 is joined to the out facing cylindrical surface 256 along conical surface 258 by arcuate perimeters 260 and 262. The bottom surface 254 is joined to the out facing cylindrical surfaces 256 by an arcuate perimeter 264. Typically ring 12 has an outside diameter of 31 inches and a height of 9 inches, in which case the radii of curved perimeters 264 and 262 would be about 2 inches and the radius of curved perimeter 260 would be about 4 inches. There results a sloping conical surface portion 258, having an angle a, FIG. 3, of approximately 30°.

Figure 4:
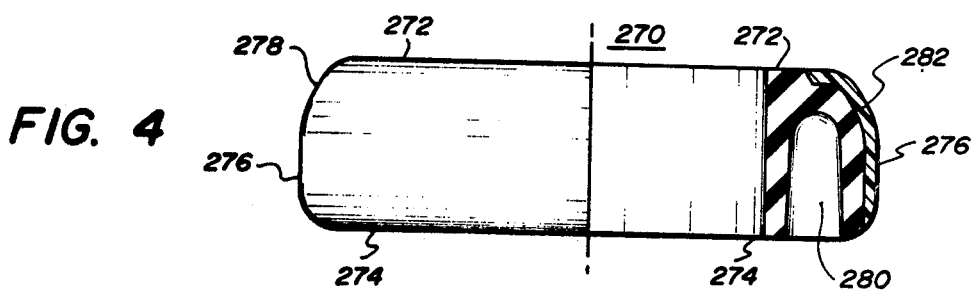
FIGS. 4 and 5 are partial sectional views of other embodiments of a bumper ring.

Referring to FIG. 4, a bumper ring 270 is shown in partial section having the same general shape as the bumper ring 12 of FIG. 3. Bumper ring 270 has a top and bottom surface 272 and 274, respectively, and an out facing cylindrical surface 276. Top surface 272 is joined along an out facing conical surface 278 to the out facing cylindrical surface 276. Bumper ring 270 is composed of a resilient material such as rubber or the like and includes relief holes 280 molded from the bottom surface 274. Bumper ring 270 includes an antifriction layer 282 of material, such as for example, urethane clad to the conical surface 278 and the out facing cylindrical surface 276. Anti-friction layer 282 may be bonded to the ring 270 as shown in FIG. 4 or may be bonded and mechanically connected to the ring 270 using mechanical interlocks 284 and 286 of FIG. 5.

The advantages of bumper rings 12 and 270 will now be apparent when considered in connection with FIGS. 2 and 6-8. Referring to FIG. 2, a vessel 300 moored to an offshore platform in an open sea with an impinging wave causes the vessel to experience sway, heave and roll motions. These motions cause the vessel 300 to move laterally into the bumper assembly 200. Rub rails 302 on the vessel may deflect the bumper rings 12 horizontally inward as well as vertically up or down before the vessel moves away from the bumper assembly 200.

Figure 5:
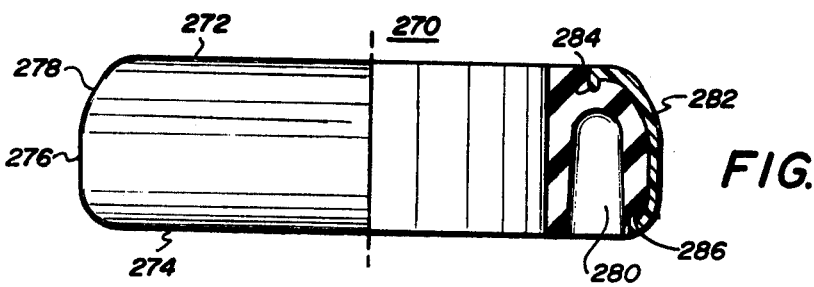
Figures 6, 7, 8:
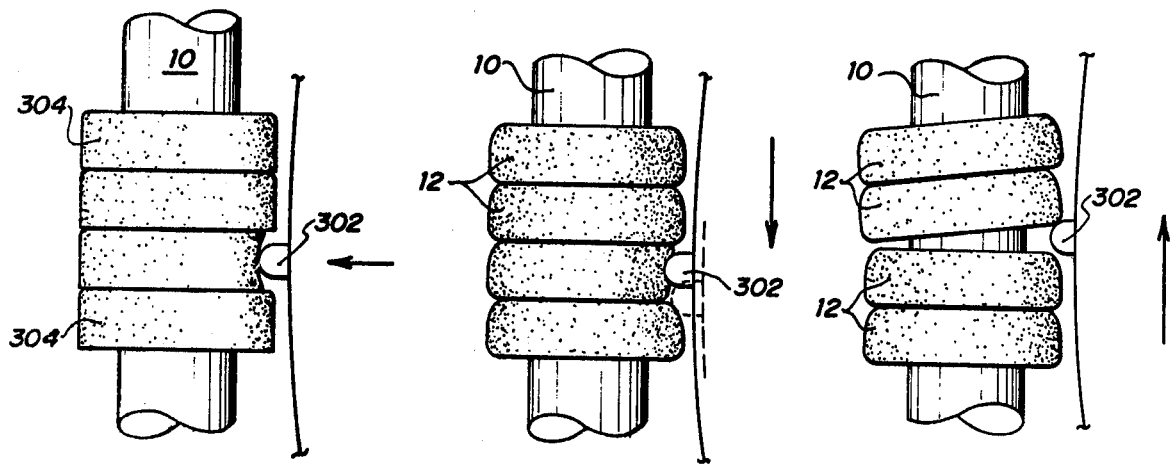
FIGS. 6, 7 and 8 are diagrammatic illustrations of bumper ring deflection caused by forces imparted by a vessel.

FIG. 6 shows the rub rail 302 deflecting bumper ring 304 inwardly. Bumper ring 304 is shown with squared corners. Such bumper rings catch the rub rail 302 and are readily torn at the shoulder when the boat moves downward. However, using the bumper rings 12, FIG. 3, movement of the rub rail 302 will not readily damage the bumper rings 12. The rub rail tends to slide off because of the form of curvature of the upper corner on the bumper ring. Bumper rings 12 are free to move vertically. Upward movement causes contact to be made by the bumper ring 12 with the side of the vessel adjacent to rub rails 302 when the vessel 300 moves vertically upward against the rings adjacent rub rails 302. Bumper rings having the configuration shown in FIGS. 3-5 provide particularly high performance and exhibit long life relative to prior rings. The protective coating of FIGS. 4 and 5 serves further to lower the frictional force impressed on the bumper rings and minimize wear.

Bumper assembly 200, FIG. 2, includes a support spring unit 350. Spring unit 350 is shown as the lowermost element surrounding the pipe column 10. Spring unit 350 is compressible. It may include a plurality of spring sections or interior cavities which permit compression, allowing the stack of bumper rings 12 to move downward. Freedom of movement thus provided prevents stress from increasing when rub rail 302 exerts downwardly directed vertical forces against the bumper rings 12.

Figure 9:
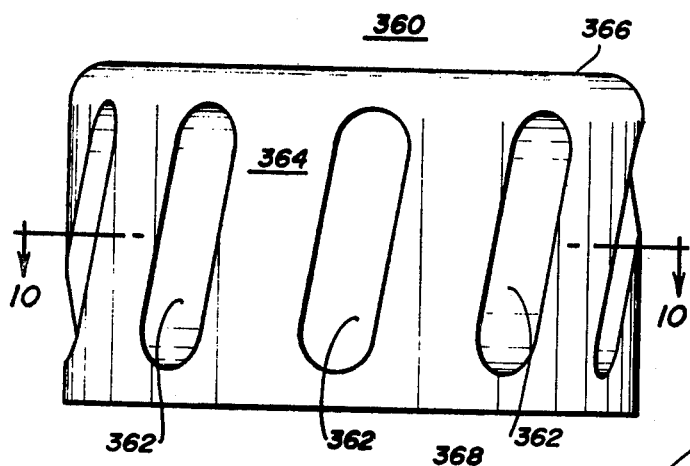
FIG. 9 is an elevation view of a bumper spring.
Figure 10:
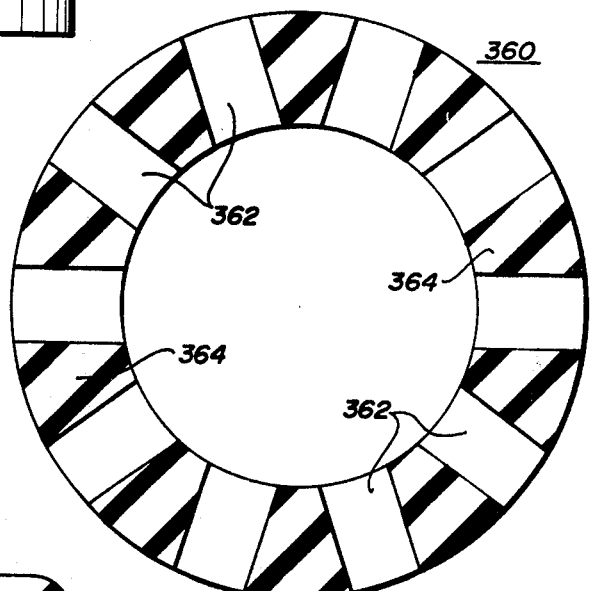
FIG. 10 is a sectional view taken along the lines 10—10 of FIG. 9.

FIGS. 9-12 illustrate embodiments of a compressible spring 350. FIGS. 9 and 10 illustrate a particular bottom spring unit 360 in the form of a cylinder about twice the height of rings 12. A plurality of vertical slots 362 are formed in a rubber or urethane body 364. The slots are shown slanted at an angle of approximately 10°. However, the slots may be vertical, i.e., perpendicular to the upper and lower surfaces 366 and 368, respectively, of spring 360. As the boat of FIG. 2 rides downwardly, spring unit 350 compresses or collapses thereby minimizing the destructive forces on the rings in contact with rub rails 302.

Figure 11:
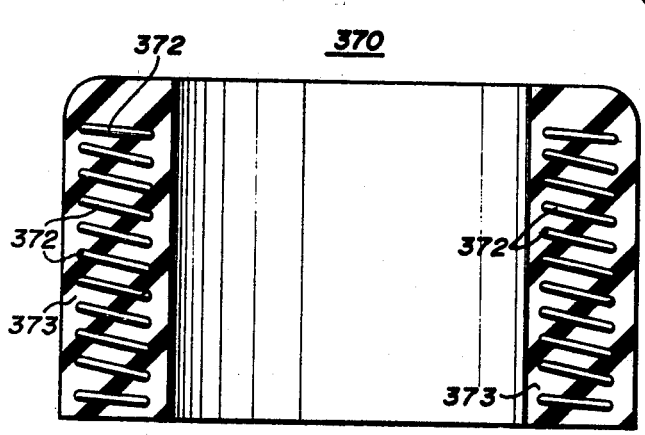
FIG. 11 is a sectional view of a bumper spring.

FIG. 11 illustrates a second embodiment of a support spring unit. Spring unit 370 includes a plurality of slim coil springs 372 spaced circumferentially within a resilient body structure 373.

Coil springs 372 are of diameter smaller than the wall thickness of body 373. Springs 372 preferably will be cast in body 373 at uniform spaced locations around ring 370. Springs 372 in conjunction with body 370 provide support for the normal weight of the stack of rings 12 of FIGS. 1 and 2 and yet will yield in compression under vessel imposed loading.

Figure 12:
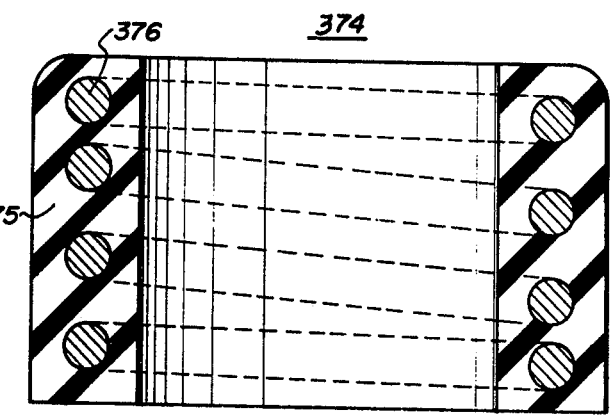
FIG. 12 is a sectional view of a further bumper spring.

FIG. 12 illustrates a further embodiment of a support spring unit. Spring unit 374 includes a single large diameter coil spring 376 cast in ring body 375 to provide static load support yieldable to downward forces produced by vessel loading. While only one spring ring unit 350 is shown in FIG. 2, it will be understood that two or more spring ring unit may be employed.

It will now be appreciated that the rings 12 may be made buoyant so that they would rise to the top. In such case, the spring 350, FIG. 2, would be located at the top of the stack.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a bumper for attachment to a stable structure for fending off vessels floating adjacent thereto, the combination which comprises:
   (a) a rigid upright column; and
   (b) an outer protective shield surrounding said column and of material which is yieldable compared to the material of said column wherein the outer protective shield comprises a plurality of elastomeric bumper rings surrounding said column in a stacked relationship, wherein the lowermost bumper ring surrounding said column forms a spring means, the spring means comprising a spring having as its center the center of said plurality of elastomeric bumper rings, said spring means sized to receive and freely move on said column for receiving and absorbing axially directed forces on said outer protective shield.

2. In a bumper for attachment to a stable structure for fending off vessels floating adjacent thereto, the combination which comprises:
   (a) a rigid upright column; and
   (b) an outer protective shield surrounding said column and of material which is yieldable compared to the material of said column wherein said the outer protective shield comprises a plurality of elastomeric bumper rings surrounding said column in a stacked relationship, wherein the lowermost bumper ring surrounding said column comprises a spring means and includes a plurality of springs spaced circumferentially around said lowermost bumper ring, said spring means sized to receive and freely move on said column for receiving and absorbing axially directed forces on said outer protective shield.

3. In a bumper for attachment to a stable structure for fending off vessels floating adjacent thereto, the combination which comprises:
   (a) a rigid upright column; and
   (b) an outer protective shield surrounding said column and of material which is yieldable compared to the material of said column wherein the outer protective shield comprises a plurality of elastomeric bumper rings surrounding said column in a stacked relationship, wherein the uppermost bumper ring surrounding said columms forms a spring means, the spring means comprising a spring having as its center the center of said plurality of elastomeric bumper rings, said spring means sized to receive and freely move on said column for receiving and absorbing axially directed forces on said outer protective shield.

4. In a bumper for attachment to a stable structure for fending off vessels floating adjacent thereto, the combination which comprises:
   (a) a rigid upright column; and
   (b) an outer protective shield surrounding said column and of material which is yieldable compared to the material of said column wherein the outer protective shield comprises a plurality of elastomeric bumper rings surrounding said column in a stacked relationship, wherein the uppermost bumper rings surrounding said column comprises a spring means and includes a plurality of springs spaced circumferentially around said uppermost bumper ring, said spring means sized to receive and freely move on said column for receiving and absorbing axially directed forces on said outer protective shield.

* * * * *

UNITED STATES PATENT AND TRADEMARK OFFICE
CERTIFICATE OF CORRECTION

PATENT NO. : 4,098,211

DATED : July 4, 1978

INVENTOR(S) : James H. Files, John M. Montague, and Clarence T. Thomerson

It is certified that error appears in the above-identified patent and that said Letters Patent are hereby corrected as shown below:

Column 3, line 46, "surfaces" should be --surface--.

Column 5, line 38, "wherein said the" should be --wherein the--.

Signed and Sealed this

Eighth Day of May 1979

[SEAL]

Attest:

RUTH C. MASON
*Attesting Officer*

DONALD W. BANNER
*Commissioner of Patents and Trademarks*